US010316601B2

(12) United States Patent
Walton et al.

(10) Patent No.: US 10,316,601 B2
(45) Date of Patent: Jun. 11, 2019

(54) COATINGS FOR A DEGRADABLE WELLBORE ISOLATION DEVICE

(71) Applicant: Halliburton Energy Services, Inc., Houston, TX (US)

(72) Inventors: Zachary William Walton, Coppell, TX (US); Michael Linley Fripp, Carrollton, TX (US); Zachary Ryan Murphree, Dallas, TX (US); Jesse C. Porter, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 60 days.

(21) Appl. No.: 15/500,473

(22) PCT Filed: Aug. 25, 2014

(86) PCT No.: PCT/US2014/052477
§ 371 (c)(1),
(2) Date: Jan. 30, 2017

(87) PCT Pub. No.: WO2016/032418
PCT Pub. Date: Mar. 3, 2016

(65) Prior Publication Data
US 2017/0218713 A1    Aug. 3, 2017

(51) Int. Cl.
*E21B 29/02* (2006.01)
*E21B 23/04* (2006.01)
*E21B 33/12* (2006.01)
(Continued)

(52) U.S. Cl.
CPC ............ *E21B 29/02* (2013.01); *C09D 123/16* (2013.01); *E21B 33/12* (2013.01); *E21B 33/1208* (2013.01); *E21B 33/129* (2013.01)

(58) Field of Classification Search
CPC ........ E21B 29/02; E21B 29/00; E21B 34/063; E21B 23/04; E21B 33/1208
See application file for complete search history.

(56) References Cited

U.S. PATENT DOCUMENTS

| 7,647,964 B2 | 1/2010 | Akbar et al. |
| 2005/0205265 A1 | 9/2005 | Todd et al. |

(Continued)

FOREIGN PATENT DOCUMENTS

WO    2012174101 A2    12/2012

OTHER PUBLICATIONS

Australian Examination Report dated Feb. 24, 2017; Australian Patent Application No. 2014404427.
(Continued)

*Primary Examiner* — Cathleen R Hutchins
(74) *Attorney, Agent, or Firm* — McGuireWoods LLP

(57) ABSTRACT

A wellbore isolation device comprising: one or more materials, wherein the one or more materials degrade after contact with a fluid; and a non-metallic coating, wherein the coating covers the one or more materials of the wellbore isolation device, and wherein the coating partially or wholly degrades after contact with a wellbore fluid. A method of removing the wellbore isolation device comprising: degrading the coating via contact with a wellbore fluid; and contacting the portion of the wellbore isolation device with a fluid, wherein the portion of the wellbore isolation device comprises one or more materials that degrade after contact with the fluid.

19 Claims, 3 Drawing Sheets

(51) Int. Cl.
*C09D 123/16* (2006.01)
*E21B 33/129* (2006.01)

(56) References Cited

U.S. PATENT DOCUMENTS

| | | |
|---|---|---|
| 2007/0181224 A1 | 8/2007 | Marya et al. |
| 2010/0294510 A1 | 11/2010 | Holmes |
| 2011/0048743 A1 | 3/2011 | Stafford et al. |
| 2011/0132621 A1* | 6/2011 | Agrawal ................ E21B 23/04 166/376 |
| 2011/0247833 A1* | 10/2011 | Todd ................... E21B 33/1204 166/386 |
| 2011/0277989 A1* | 11/2011 | Frazier ................. E21B 33/129 166/193 |
| 2012/0273229 A1 | 11/2012 | Xu et al. |
| 2012/0318513 A1 | 12/2012 | Mazyar et al. |
| 2013/0029886 A1 | 1/2013 | Mazyar et al. |
| 2013/0043041 A1 | 2/2013 | McCoy et al. |
| 2013/0048305 A1 | 2/2013 | Xu et al. |
| 2013/0168257 A1 | 7/2013 | Mazyar et al. |
| 2014/0124216 A1* | 5/2014 | Fripp ................... E21B 33/1208 166/376 |
| 2014/0190685 A1 | 7/2014 | Frazier et al. |
| 2014/0224507 A1 | 8/2014 | Frip et al. |

OTHER PUBLICATIONS

International Search Report and Written Opinion dated May 21, 2015; International PCT Application No. PCT/US2014/052477.
Canadian Office Action dated Oct. 18, 2017; Canadian Patent Application No. 2,948,590.

* cited by examiner

COATINGS FOR A DEGRADABLE WELLBORE ISOLATION DEVICE

TECHNICAL FIELD

An isolation device and methods of removing the isolation device are provided. The isolation device includes a coating. The coating surrounds at least a portion of the isolation device that includes a degradable material. The coating degrades upon contact with a wellbore fluid. According to an embodiment, the isolation device is used in an oil or gas well operation.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION

Figure 1:
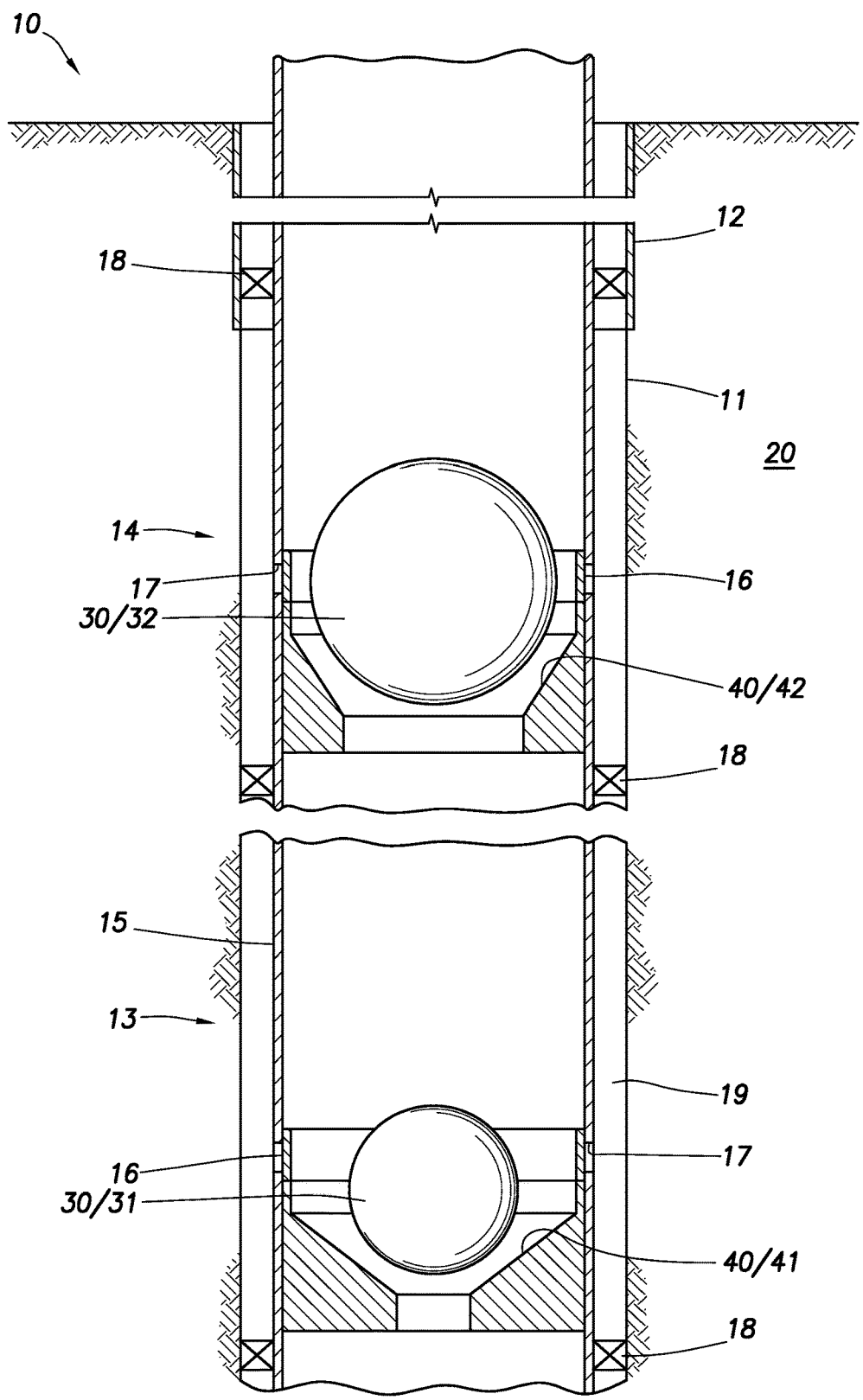
FIG. 1 is a cross-sectional illustration of a well system containing more than one isolation device of a ball and baffle.

As used herein, the words "comprise," "have," "include," and all grammatical variations thereof are each intended to have an open, non-limiting meaning that does not exclude additional elements or steps.

It should be understood that, as used herein, "first," "second," "third," etc., are arbitrarily assigned and are merely intended to differentiate between two or more materials, layers, isolation devices, wellbore intervals, etc., as the case may be, and does not indicate any particular orientation or sequence. Furthermore, it is to be understood that the mere use of the term "first" does not require that there be any "second," and the mere use of the term "second" does not require that there be any "third," etc.

As used herein, a "fluid" is a substance having a continuous phase that tends to flow and to conform to the outline of its container when the substance is tested at a temperature of 71° F. (22° C.) and a pressure of one atmosphere "atm" (0.1 megapascals "MPa"). A fluid can be a liquid or gas.

Oil and gas hydrocarbons are naturally occurring in some subterranean formations. In the oil and gas industry, a subterranean formation containing oil or gas is referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from a reservoir is called a reservoir fluid.

A well can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet radially of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

It is not uncommon for a wellbore to extend several hundreds of feet or several thousands of feet into a subterranean formation. The subterranean formation can have different zones. A zone is an interval of rock differentiated from surrounding rocks on the basis of its fossil content or other features, such as faults or fractures. For example, one zone can have a higher permeability compared to another zone. It is often desirable to treat one or more locations within multiples zones of a formation. One or more zones of the formation can be isolated within the wellbore via the use of an isolation device to create multiple wellbore intervals. At least one wellbore interval corresponds to a formation zone. The isolation device can be used for zonal isolation and functions to block fluid flow within a tubular, such as a tubing string, or within an annulus. The blockage of fluid flow prevents the fluid from flowing across the isolation device in any direction and isolates the zone of interest. In this manner, treatment techniques can be performed within the zone of interest.

Common isolation devices include, but are not limited to, a ball and a baffle, a bridge plug, a frac plug, a packer, a plug, and wiper plug. It is to be understood that reference to a "ball" is not meant to limit the geometric shape of the ball to spherical, but rather is meant to include any device that is capable of engaging with a baffle. A "ball" can be spherical in shape, but can also be a dart, a bar, or any other shape. Zonal isolation can be accomplished via a ball and baffle by dropping or flowing the ball from the wellhead onto the baffle that is located within the wellbore. The ball engages with the baffle, and the seal created by this engagement prevents fluid communication into other wellbore intervals downstream of the ball and baffle. As used herein, the relative term "downstream" means at a location further away from a wellhead. In order to treat more than one zone using a ball and baffle, the wellbore can contain more than one ball baffle. For example, a baffle can be located within each wellbore interval. Generally, the inner diameter (I.D.) of the ball baffles is different for each zone. For example, the I.D. of the ball baffles sequentially decreases at each zone, moving from the wellhead to the bottom of the well. In this manner, a smaller ball is first dropped into a first wellbore interval that is the farthest downstream; the corresponding zone is treated; a slightly larger ball is then dropped into another wellbore interval that is located upstream of the first wellbore interval; that corresponding zone is then treated; and the process continues in this fashion—moving upstream along the wellbore—until all the desired zones have been treated. As used herein, the relative term "upstream" means at a location closer to the wellhead.

A bridge plug and frac plug are composed primarily of slips, a plug mandrel, and a rubber sealing element. The bridge plug or frac plug can be introduced into a wellbore and the sealing element along with a ball can be caused to block fluid flow into downstream intervals.

Isolation devices can be classified as permanent or retrievable. While permanent isolation devices are generally designed to remain in the wellbore after use, retrievable devices are capable of being removed after use. It is often desirable to use a retrievable isolation device in order to restore fluid communication between one or more wellbore intervals. Traditionally, isolation devices are retrieved by inserting a retrieval tool into the wellbore, wherein the retrieval tool engages with the isolation device, attaches to the isolation device, and the isolation device is then removed from the wellbore. Another way to remove an isolation device from the wellbore is to mill at least a portion of the device or the entire device. Yet, another way to remove an isolation device is to contact the device with a solvent, such as an acid, thus dissolving all or a portion of the device.

However, some of the disadvantages to using traditional methods to remove a retrievable isolation device include: it can be difficult and time consuming to use a retrieval tool; milling can be time consuming and costly; and premature dissolution of the isolation device can occur. For example, premature dissolution can occur if acidic fluids are used in the well prior to the time at which it is desired to dissolve the isolation device. Therefore, it is becoming increasingly worthy to utilize retrievable isolation devices. One way to retrieve an isolation device is to make all or a portion of the device from a material that can undergo galvanic corrosion.

Galvanic corrosion occurs when two different materials, such as metals or metal alloys are in electrical connectivity with each other and both are in contact with an electrolyte. As used herein, the phrase "electrical connectivity" means that the two different materials, such as metals or metal alloys are either touching or in close enough proximity to each other such that when the two different materials are in contact with an electrolyte, the electrolyte becomes electrically conductive and ion migration occurs between one of the materials and the other material, and is not meant to require an actual physical connection between the two different materials, for example, via a metal wire. It is to be understood that as used herein, the term "metal" is meant to include pure metals and also metal alloys without the need to continually specify that the metal can also be a metal alloy. Moreover, the use of the phrase "metal or metal alloy" in one sentence or paragraph does not mean that the mere use of the word "metal" in another sentence or paragraph is meant to exclude a metal alloy. As used herein, the term "metal alloy" means a mixture of two or more elements, wherein at least one of the elements is a metal. The other element(s) can be a non-metal or a different metal. An example of a metal and non-metal alloy is steel, comprising the metal element iron and the non-metal element carbon. An example of a metal and metal alloy is bronze, comprising the metallic elements copper and tin. It is also possible for certain metal alloys, such as a metal alloy containing at least 50% magnesium to undergo galvanic corrosion without a distinct cathode being present when the alloy is in contact with an electrolyte. As used herein, the term "galvanic corrosion" also includes "micro-galvanic corrosion" where the anode and cathode are part of the metal alloy. The term "galvanic corrosion" can also include configurations where there is a nano-structured matrix of anodic and cathodic components. The term galvanic corrosion is also intended to cover applications where there are distinct regions of anodic and cathodic materials within the metal.

The material that is less noble, compared to the other material, will dissolve in the electrolyte. The less noble material is often referred to as the anode, and the more noble material is often referred to as the cathode. The anode and the cathode can form a galvanic couple. Galvanic corrosion is an electrochemical process whereby free ions in the electrolyte make the electrolyte electrically conductive, thereby providing a means for ion migration from the anode to the cathode—resulting in deposition formed on the cathode. Materials can be arranged in a galvanic series. The galvanic series lists materials in order of the most noble to the least noble. An anodic index lists the electrochemical voltage (V) that develops between a material and a standard reference electrode (gold (Au)) in a given electrolyte. The actual electrolyte used can affect where a particular material appears on the galvanic series and can also affect the electrochemical voltage. For example, the dissolved oxygen content in the electrolyte can dictate where the metal or metal alloy appears on the galvanic series and the metal's electrochemical voltage. The anodic index of gold is −0 V; while the anodic index of beryllium is −1.85 V. A material that has an anodic index greater than another material is more noble than the other material and will function as the cathode. Conversely, the material that has an anodic index less than another material is less noble and functions as the anode. In order to determine the relative voltage between two different materials, the anodic index of the lesser noble material is subtracted from the other material's anodic index, resulting in a positive value.

There are several factors that can affect the rate of galvanic corrosion. One of the factors is the distance separating the materials on the galvanic series chart or the difference between the anodic indices of the materials. For example, beryllium is one of the last materials listed at the least noble end of the galvanic series and platinum is one of the anodes listed at the most noble end of the series. By contrast, tin is listed directly above lead on the galvanic series. Using the anodic index of materials, the difference between the anodic index of gold and beryllium is 1.85 V; whereas, the difference between tin and lead is 0.05 V. This means that galvanic corrosion will occur at a much faster rate for magnesium or beryllium and gold compared to lead and tin.

The following is a partial galvanic series chart using a deoxygenated sodium chloride water solution as the electrolyte. The materials are listed in descending order from the most noble (cathodic) to the least noble (anodic). The following list is not exhaustive, and one of ordinary skill in the art is able to find where a specific material, metal, or metal alloy is listed on a galvanic series in a given electrolyte.

PLATINUM
GOLD
ZIRCONIUM
GRAPHITE
SILVER
CHROME IRON
SILVER SOLDER
COPPER—NICKEL ALLOY 80-20
COPPER—NICKEL ALLOY 90-10
MANGANESE BRONZE (CA 675), TIN BRONZE (CA903, 905)
COPPER (CA102)
BRASSES

NICKEL (ACTIVE)
TIN
LEAD
ALUMINUM BRONZE
STAINLESS STEEL
CHROME IRON
MILD STEEL (1018), WROUGHT IRON
ALUMINUM 2117, 2017, 2024
CADMIUM
ALUMINUM 5052, 3004, 3003, 1100, 6053
ZINC
MAGNESIUM
BERYLLIUM

The following is a partial anodic index listing the voltage of a listed material against a standard reference electrode (gold) using a deoxygenated sodium chloride water solution as the electrolyte. The materials are listed in descending order from the greatest voltage (most cathodic) to the least voltage (most anodic). The following list is not exhaustive, and one of ordinary skill in the art is able to find the anodic index of a specific material in a given electrolyte.

Anodic index

| Metal | Index (V) |
| --- | --- |
| Gold, solid and plated, Gold-platinum alloy | −0.00 |
| Rhodium plated on silver-plated copper | −0.05 |
| Silver, solid or plated; monel metal; high nickel-copper alloys | −0.15 |
| Nickel, solid or plated, titanium and alloys, monel | −0.30 |
| Copper, solid or plated; low brasses or bronzes; silver solder; German silvery high copper-nickel alloys; nickel-chromium alloys | −0.35 |
| Brass and bronzes | −0.40 |
| High brasses and bronzes | −0.45 |
| 18% chromium type corrosion-resistant steels | −0.50 |
| Chromium plated; tin plated; 12% chromium type corrosion-resistant steels | −0.60 |
| Tin-plate; tin-lead solder | −0.65 |
| Lead, solid or plated; high lead alloys | −0.70 |
| 2000 series wrought aluminum | −0.75 |
| Iron, wrought, gray or malleable, plain carbon and low alloy steels | −0.85 |
| Aluminum, wrought alloys other than 2000 series aluminum, cast alloys of the silicon type | −0.90 |
| Aluminum, cast alloys other than silicon type, cadmium, plated and chromate | −0.95 |
| Hot-dip-zinc plate; galvanized steel | −1.20 |
| Zinc, wrought; zinc-base die-casting alloys; zinc plated | −1.25 |
| Magnesium & magnesium-base alloys, cast or wrought | −1.75 |
| Beryllium | −1.85 |

Another factor that can affect the rate of galvanic corrosion is the temperature and concentration of the electrolyte. The higher the temperature and concentration of the electrolyte, generally the faster the rate of corrosion. Yet another factor that can affect the rate of galvanic corrosion is the total amount of surface area of the least noble (anodic material). The greater the surface area of the anode that can come in contact with the electrolyte, the faster the rate of corrosion. The cross-sectional size of the anodic material pieces can be decreased in order to increase the total amount of surface area per total volume of the material. The anodic metal or metal alloy can also be a matrix in which pieces of cathode material is embedded in the anode matrix. Yet another factor that can affect the rate of galvanic corrosion is the ambient pressure. Depending on the electrolyte chemistry and the two materials, the corrosion rate can be slower at higher pressures than at lower pressures if gaseous components are generated. Yet another factor that can affect the rate of galvanic corrosion is the physical distance between the two different metal and/or metal alloys of the galvanic system.

A degradable isolation device, such as a baffle, frac ball and bridge plug or frac plug, should be able to withstand a pressure differential for a desired amount of time once the device has been positioned within a wellbore. For example, it is expected that a ball and baffle combination is capable of maintaining zonal isolation for a desired period of time after the ball lands on the baffle by creating a seal with the baffle. Depending on the materials used to create the dissolvable portion of the device, the rate of corrosion can be too fast for the device to maintain zonal isolation for the desired period of time. Therefore, there is a need for improved ways to delay the dissolution of a degradable baffle, bridge plug, or frac plug.

According to certain embodiments, a wellbore isolation device comprises: one or more materials, wherein the one or more materials degrade after contact with a fluid; and a non-metallic coating, wherein the coating surrounds the one or more materials of the wellbore isolation device, and wherein the coating partially or wholly degrades after contact with a wellbore fluid.

According to certain embodiments, a method of removing a wellbore isolation device comprises: degrading at least a portion of a non-metallic coating via contact with a wellbore fluid, wherein the coating covers at least a portion of the wellbore isolation device prior to contact with the wellbore fluid, and wherein the portion of the wellbore isolation device is exposed to the wellbore fluid after dissolution of the coating; and contacting the portion of the wellbore isolation device with a fluid, wherein at least the portion of the wellbore isolation device comprises one or more materials that degrade after contact with the fluid.

Any discussion of the embodiments regarding the isolation device or any component related to the isolation device (e.g., the coating) is intended to apply to all of the apparatus, system, and method embodiments.

Turning to the Figures, FIG. 1 depicts a well system 10. The well system 10 can include at least one wellbore 11. The wellbore 11 can penetrate a subterranean formation 20. The subterranean formation 20 can be a portion of a reservoir or adjacent to a reservoir. The wellbore 11 can include a casing 12. The wellbore 11 can include a wellbore section that is only generally vertical or can include a wellbore section that is only generally horizontal. A tubing string 15 can be installed in the wellbore 11. The well system 10 can comprise at least a first wellbore interval 13 and a second wellbore interval 14. The well system 10 can also include more than two wellbore intervals, for example, the well system 10 can further include a third wellbore interval, a fourth wellbore interval, and so on. At least one wellbore interval can correspond to a specific zone of the subterranean formation 20. The well system 10 can further include one or more packers 18. The packers 18 can be used in addition to the isolation device to create the wellbore intervals and isolate each zone of the subterranean formation 20. The packers 18 can be used to prevent fluid flow between one or more wellbore intervals (e.g., between the first wellbore interval 13 and the second wellbore interval 14) via an annulus 19. The tubing string 15 can also include one or more ports 17. One or more ports 17 can be located in each wellbore interval. Moreover, not every wellbore interval needs to include one or more ports 17. For example, the first wellbore interval 13 can include one or more ports 17, while the second wellbore interval 14 does not contain a port. In this manner, fluid flow into the annulus 19 via the ports 17 for a particular wellbore interval can be selected based on the specific oil or gas operation.

It should be noted that the well system 10 is illustrated in the drawings and is described herein as merely one example of a wide variety of well systems in which the principles of this disclosure can be utilized. It should be clearly understood that the principles of this disclosure are not limited to any of the details of the well system 10, or components thereof, depicted in the drawings or described herein. Furthermore, the well system 10 can include other components not depicted in the drawing. For example, the well system 10 can further include a well screen. By way of another example, cement may be used instead of packers 18 to aid the isolation device in providing zonal isolation. Cement may also be used in addition to packers 18.

Figure 3:
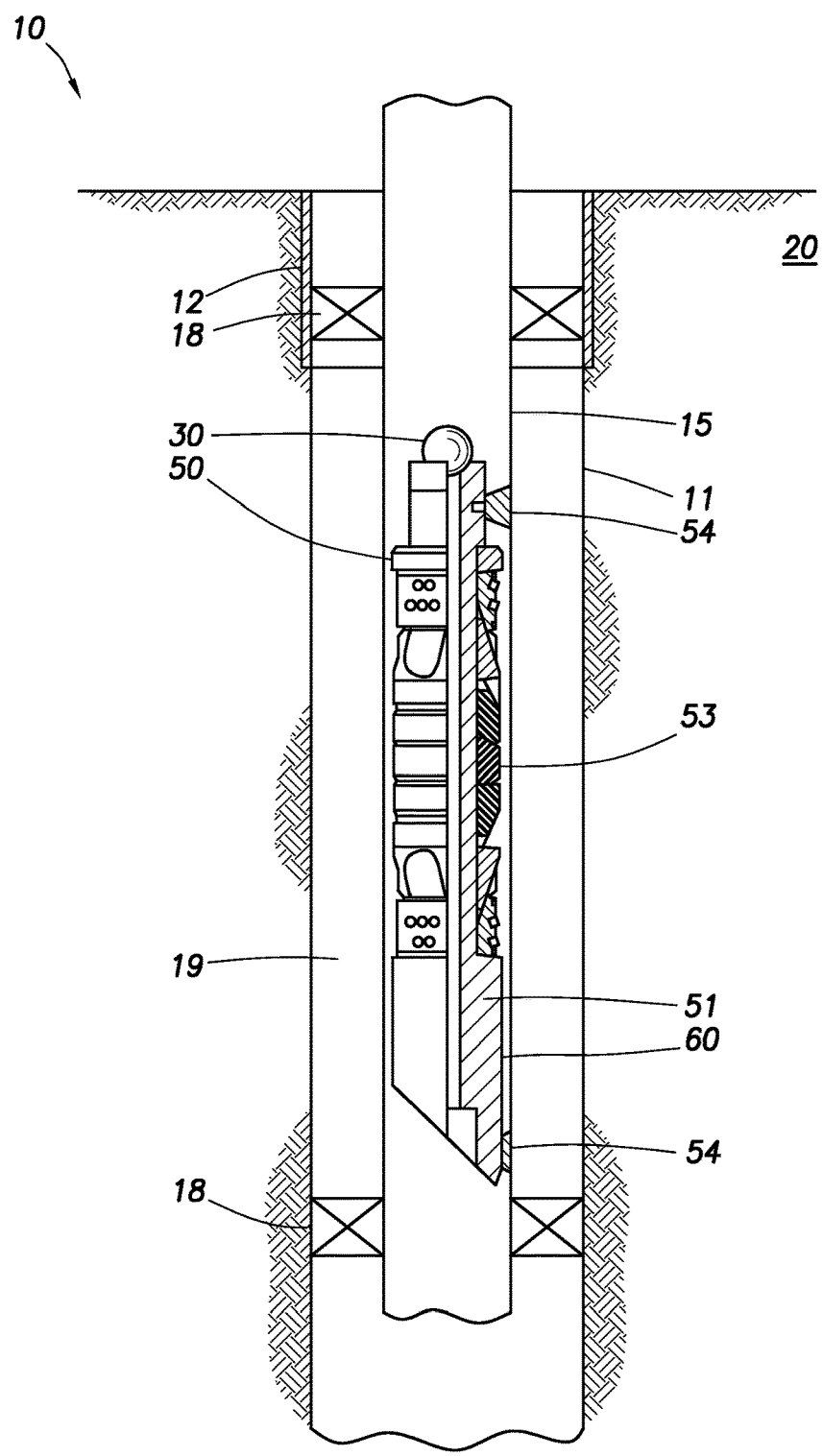
FIG. 3 is a cross-sectional illustration of a well system containing a frac plug and coating.

According to an embodiment, the isolation device is capable of restricting or preventing fluid flow between a first wellbore interval 13 and a second wellbore interval 14. The first wellbore interval 13 can be located upstream or downstream of the second wellbore interval 14. In this manner, depending on the oil or gas operation, fluid is restricted or prevented from flowing downstream or upstream into the second wellbore interval 14. According to an embodiment, the isolation device is a ball and baffle, a bridge plug, or a frac plug. The isolation device includes one or more materials that degrade after contact with a wellbore fluid. As used herein, the term "degrade" and all grammatical variations thereof, means a break-down, corrosion, dissolution, or softening or melting of the material. For example, the material can melt at bottomhole temperatures or dissolve via galvanic corrosion or break apart. As used herein, the term "bottomhole" means the location within the wellbore where the isolation device is placed. It is to be understood that the entire isolation device can be made from the one or more materials that degrade after contact with the wellbore fluid. An example of this embodiment is when the baffle is made of the one or more materials. Only a portion of the isolation device can be made from the one or more materials. An example of this other embodiment is when a bridge plug or frac plug (as depicted in FIG. 3) contains a degradable core 51 made from the one or more materials. The portion of the isolation device that comprises the one or more materials can be the core or mandrel of a bridge or frac plug, a spacer ring, a slip, a wedge, a retainer ring, an extrusion limiter or backup shoe, a mule shoe, a flapper, a baffle, or a sleeve. It is to also be understood that the entire isolation device can be coated with the coating, or only certain portions can be coated. Moreover, one portion may be coated with the coating while another portion is coated with a completely different coating.

Figure 2A:
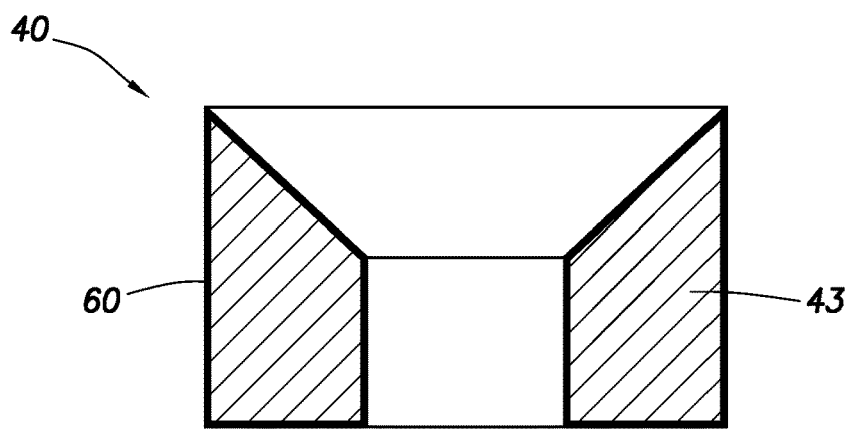
FIG. 2A is an enlarged cross-sectional view of the baffle of FIG. 1 with a coating.
Figure 2B:
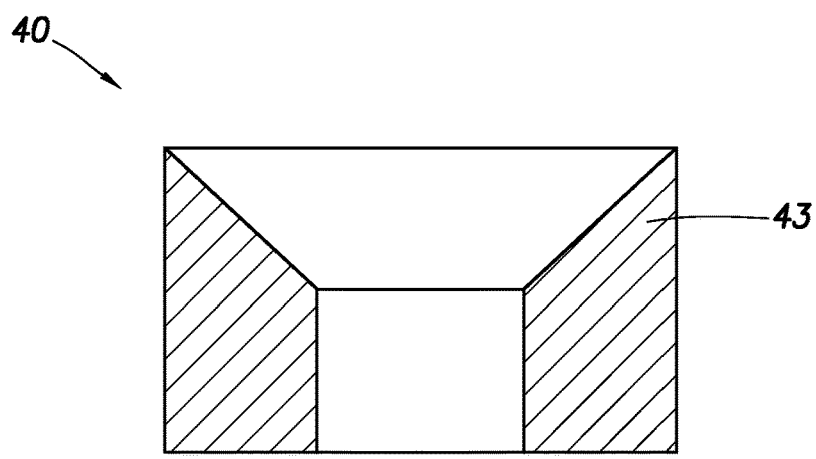
FIG. 2B is the baffle from FIG. 2A after the coating has been removed.

As depicted in FIGS. 1 and 2A-2B, the isolation device can be a ball 30 (e.g., a first ball 31 or a second ball 32) and a baffle 40 (e.g., a first baffle 41 or a second baffle 42). The ball 30 can engage the baffle 40. The baffle 40 can be located on the inside of a tubing string 15. The inner diameter (I.D.) of the first baffle 41 can be less than the I.D. of the second baffle 42. In this manner, a first ball 31 can be dropped or flowed into wellbore. The first ball 31 can have a smaller outer diameter (O.D.) than the second ball 32. The first ball 31 can engage the first baffle 41. Fluid can now be temporarily restricted or prevented from flowing into any wellbore intervals located downstream of the first wellbore interval 13. In the event it is desirable to temporarily restrict or prevent fluid flow into any wellbore intervals located downstream of the second wellbore interval 14, then the second ball 32 can be dropped or flowed into the wellbore and will be prevented from falling past the second baffle 42 because the second ball 32 has a larger O.D. than the I.D. of the second baffle 42. The second ball 32 can engage the second baffle 42. The ball (whether it be a first ball 31 or a second ball 32) can engage a sliding sleeve 16 during placement. This engagement with the sliding sleeve 16 can cause the sliding sleeve to move; thus, opening a port 17 located adjacent to the baffle. The port 17 can also be opened via a variety of other mechanisms instead of a ball. The use of other mechanisms may be advantageous when the isolation device is not a ball. After placement of the isolation device, fluid can be flowed from, or into, the subterranean formation 20 via one or more opened ports 17 located within a particular wellbore interval. As such, a fluid can be produced from the subterranean formation 20 or injected into the formation.

As can be seen in FIG. 3, the isolation device can be a bridge plug or frac plug 50. The bridge plug or frac plug 50 can include a degradable core or mandrel 51. The bridge plug or frac plug 50 can also include one or more sealing elements 53. The sealing elements 53 can be used to create a seal within the wellbore 11 and prevent fluid flow across the plug through the annulus 19. The bridge plug or frac plug 50 can also include one or more bumpers 54. The bumpers 54 can be positioned on the outside of the plug and protect the coating 60 from prematurely becoming scratched or compromised during the placement or running of the plug into the wellbore.

The isolation device also includes a coating 60. The coating 60 covers at least the portion of the isolation device that is made from the one or more materials. By way of example and as can be seen in FIG. 2A, the coating 60 can completely surround the degradable core 43 of the baffle 40. As can be seen in FIG. 3, the coating can cover the degradable core or mandrel 51 of the bridge plug or frac plug 50. The coating 60 covers at least the portion of the isolation device prior to contact with the wellbore fluid. The coating 60 partially or wholly degrades via contact with the wellbore fluid. The intact coating can also contain any already-degraded one or more materials of the isolation device. By way of example, if the one or more materials degrade via melting at the bottomhole temperature of the wellbore, then the one or more materials may have already melted prior to degradation of the coating. However, the intact or pre-degraded coating (and optionally other components of the isolation device) will contain the melted materials for the desired amount of time. The portion of the wellbore isolation device that contains the one or more materials is exposed after degradation of the coating. By way of example and as can be seen in FIG. 2B, the degradable core 43 of the baffle 40 is exposed after the coating 60 has degraded.

The coating 60 is non-metallic. As used herein, the term "non-metallic" means that the coating does not contain metals or metal alloys. Preferably, the coating 60 does not degrade via corrosion, including galvanic corrosion. A metallic coating can interfere with a galvanic reaction of the portion of the isolation device. A metallic coating will have its own galvanic potential with respect to the portion of the isolation device. If a metallic coating is prematurely scratched, then the protective layer could actually accelerate the galvanic reaction of the portion of the isolation device rather than delaying the galvanic reaction. The coating can be a polymer. According to certain embodiments, the coating 60 is made from a plastic, a thermoplastic, an epoxy material, a rubber, a glass, or a ceramic. The coating preferably degrades in the wellbore fluid via dissolution, softening, or melting. Accordingly, the coating does not degrade via etching, eroding or scratching from particulates or wellbore equipment. The coating 60 can be made from a substance that has a melting point less than or equal to the bottomhole temperature of the wellbore. In this manner, once placed into the wellbore, the surrounding temperature of the wellbore fluid can begin to melt the coating, thus exposing the underlying isolation device or portion of the isolation device containing the one or more materials. The coating 60 can also be made from a substance that dissolves in the wellbore fluid. The wellbore fluid can be a fluid that is introduced into the wellbore or the fluid can be a produced fluid from a reservoir. By way of example, ethylene propylene diene (M-class) "EPDM" rubber is soluble in hydrocarbon liquids. As such, the coating can be made from EPDM rubber, and the coating will begin to dissolve during production of an oil-based reservoir fluid. An oil-based reservoir fluid is a fluid produced from a reservoir that is greater than about 50% composed of a liquid hydrocarbon.

The methods include degrading the coating via contact with the wellbore fluid. The methods can further include contacting or allowing the coating 60 to come in contact with the wellbore fluid. According to certain embodiments, the coating does not begin to degrade until after a desired amount of time has elapsed since coming in contact with the wellbore fluid. For example, the desired amount of time can be in the range of about 5 minutes to about 72 hours or about 4 hours to 48 hours. In this manner, the coating can delay degradation of the one or more materials making up the isolation device for this desired amount of time. The substance making up the coating 60 can be selected such that the coating does not begin degrading, or degrades at a reduced rate, for the desired amount of time. According to certain embodiments, the portion of the isolation device is not exposed to the wellbore fluid for a desired amount of time. This embodiment can be useful when the coating begins to degrade rather soon after placement of the isolation device into the wellbore; however, it is desirable to delay degradation of the portion of the isolation device. In this manner, even though the coating may begin to degrade, the portion of the isolation device is still protected from coming in contact with the wellbore fluid and will remain intact. The thickness of the coating can be selected such that the portion of the isolation device is exposed to the wellbore fluid after the desired amount of time. The thickness of the coating can be in the range from about 0.0001 inches (in.) to about 0.025 in. The thickness of the coating can be selected based in part on, the bottomhole temperature of the well, the substance making up the coating, and the mechanism by which the coating degrades (e.g., dissolution in a reservoir fluid or melting), among other considerations.

The portion of the isolation device is contacted with a fluid. The one or more materials of the portion of the isolation device degrade after coming in contact with the fluid. The fluid can be the same wellbore fluid that causes degradation of the coating. The fluid can also be different from the wellbore fluid. For example, the portion of the isolation device can also come in contact with a second wellbore fluid. This embodiment can be useful when the wellbore fluid degrades the coating, but will not degrade the one or more materials making up the portion of the isolation device. A second wellbore fluid can then be introduced into the wellbore to come in contact with the portion of the isolation device to degrade the one or more materials. The fluid can be, for example, an electrolyte such as for galvanic corrosion, an acid, a base, or other solvent for dissolving the one or more materials.

According to certain embodiments, the one or more materials of the portion of the isolation device can degrade via corrosion, galvanic corrosion, dissolution, softening, or melting. The one or more materials can include, without limitation, metals, metal alloys, plastics, thermoplastics, eutectic compositions, and composite materials.

By way of a first example, a metal alloy can undergo galvanic corrosion in the presence of the electrolyte without a distinct cathode being present. According to certain embodiments, the metal alloy comprises magnesium as the metal. The magnesium can be at a concentration of at least 50% by volume of the metal alloy. According to an embodiment, the magnesium is at a concentration in the range of about 70% to about 98%, preferably about 80% to about 95%, by volume of the metal alloy. According to certain embodiments, the metal alloy undergoes corrosion in the presence of the wellbore fluid instead of undergoing galvanic corrosion in the presence of an electrolyte.

By way of a second example, the one or more materials can undergo galvanic corrosion when in contact with the electrolyte and at least one of the materials can be an anode of a galvanic system. The isolation device can further include a cathode of the galvanic system. The anode partially or wholly dissolves when an electrically conductive path exists between the anode and the cathode and when both the anode and the cathode are in contact with the electrolyte. According to these embodiments, the anode and the cathode are metals or metal alloys. The metal or metal alloy can be selected from the group consisting of, lithium, sodium, potassium, rubidium, cesium, beryllium, calcium, strontium, barium, radium, aluminum, gallium, indium, tin, thallium, lead, bismuth, scandium, titanium, vanadium, chromium, manganese, thorium, iron, cobalt, nickel, copper, zinc, yttrium, zirconium, niobium, molybdenum, ruthenium, rhodium, palladium, praseodymium, silver, cadmium, lanthanum, hafnium, tantalum, tungsten, terbium, rhenium, osmium, iridium, platinum, gold, neodymium, gadolinium, erbium, oxides of any of the foregoing, graphite, carbon, silicon, boron nitride, and any combinations thereof. Preferably, the metal or metal alloy is selected from the group consisting of magnesium, aluminum, zinc, tin, iron, nickel, copper, rare earth elements, oxides of any of the foregoing, and combinations thereof.

By way of a third example, the isolation device or the portion of the isolation device is composed from a plastic that will degrade upon exposure to the wellbore fluid. For example, polyglycolic acid "PGA" plastic and polylactic acid "PLA" plastic are examples of plastics that will degrade in water. EPDM rubber will degrade in oil.

By way of a fourth example, the isolation device or the portion of the isolation device is composed from a melt-able material, such as a polyethylene or polystyrene plastic, a fusible alloy or a eutectic composition. According to this embodiment, the bottomhole temperature or a heated fluid causes the isolation device or the portion of the isolation device to melt. In this example, a cooling fluid, such as a fracturing fluid can cool the bottomhole temperature surrounding the isolation device to a temperature less than the melting point temperature of the one or more materials. The cooler temperature can solidify and strengthen the isolation device or the portion of the isolation device. Then, after cessation of pumping of the cooling fluid, the isolation device, or the portion of the isolation device re-melts and no longer provides zonal isolation within the wellbore.

By way of a fifth example, the isolation device or the portion of the isolation device is a made from a composite material. The isolation device can be created from high-wear bits held together with a degradable binder. The high-wear bits can be materials such as tungsten carbide, alumina, silicon carbide, industrial diamond, steel, sand, etc. The binder can be a degradable metal or metal alloy, a degradable plastic, a degradable rubber, a eutectic composition, or a salt. The high-wear bits can help prevent damage to the isolation device during placement into the wellbore. Preferably, the high-wear bits are tungsten carbide bits in a matrix of PGA plastic or alumina powder in a natural rubber matrix.

According to an embodiment, the portion of the isolation device is capable of withstanding a specific pressure differential for a desired amount of time. Preferably, the coating is also capable of withstanding the same pressure differential as the portion of the isolation device. As used herein, the term "withstanding" means that the substance does not crack, break, or collapse. The pressure differential can be the bottomhole pressure of the subterranean formation across the device. Formation pressures can range from about 1,000 to about 30,000 pounds force per square inch (psi) (about 6.9 to about 206.8 megapascals "MPa"). The pressure differential can also be created during oil or gas operations. For example, a fluid, when introduced into the wellbore 11 upstream or downstream of the substance, can create a higher pressure above or below, respectively, of the isolation device. Pressure differentials can range from 100 to over 10,000 psi (about 0.7 to over 68.9 MPa). The desired amount of time can be at least 30 minutes. The desired amount of time can also be in the range of about 30 minutes to 14 days, preferably 30 minutes to 2 days, more preferably 4 hours to 24 hours.

The system embodiments include that the isolation device is located within the wellbore that penetrates a subterranean formation. The methods can further include the step of placing the isolation device in a portion of the wellbore 11, wherein the step of placing is performed prior to the step of degrading the coating 60 via contact with the wellbore fluid. More than one isolation device can also be placed in multiple portions of the wellbore. The methods can further include the step of removing all or a portion of the degraded coating and/or degraded one or more materials after degradation of the coating and the one or more materials of at least the portion of the isolation device. According to an embodiment, a sufficient amount of the one or more materials dissolve such that the isolation device is capable of being flowed from the wellbore 11. According to this embodiment, the isolation device should be capable of being flowed from the wellbore via degradation of the one or more materials, without the use of a milling apparatus, retrieval apparatus, or other such apparatus commonly used to remove isolation devices.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of removing a wellbore isolation device comprising:
   degrading at least a portion of a non-metallic coating via contact with a wellbore fluid, wherein the coating covers at least a portion of the wellbore isolation device prior to contact with the wellbore fluid, and the portion of the wellbore isolation device is exposed to the wellbore fluid after degradation of the coating; and
   contacting the portion of the wellbore isolation device with a fluid, wherein at least the portion of the wellbore isolation device comprises a one or more materials that degrade after contact with the fluid, wherein the one or more materials comprise a degradable metal alloy, wherein the one or more materials comprises at least one degradable metal selected from the group consisting of aluminum, magnesium, and any combination thereof.

2. The method according to claim 1, wherein the isolation device is capable of restricting or preventing fluid flow between a first wellbore interval and a second wellbore interval.

3. The method according to claim 1, wherein the isolation device is a ball and baffle, a bridge plug, or a frac plug.

4. The method according to claim 3, wherein the portion of the isolation device that comprises the one or more materials is the baffle, a core or mandrel, a spacer ring, a slip, a wedge, a retainer ring, an extrusion limiter or backup shoe, a mule shoe, or a sleeve of the bridge plug or frac plug.

5. The method according to claim 1, any preceding claim, wherein the coating is made from a plastic, a thermoplastic, a rubber, a glass, an epoxy, or a ceramic.

6. The method according to claim 1, wherein the coating is made from a substance that has a melting point less than or equal to the bottomhole temperature of the wellbore.

7. The method according to claim 1, wherein the coating is made from ethylene propylene diene (M-class) rubber.

8. The method according to claim 7, wherein the wellbore fluid is an oil-based reservoir fluid, and wherein the rubber dissolves during production of the reservoir fluid.

9. The method according to claim 1, wherein the coating does not degrade sufficiently to expose the at least a portion of the isolation device until after a desired amount of time has elapsed since coming in contact with the wellbore fluid.

10. The method according to claim 1, wherein the one or more materials degrade via corrosion, galvanic corrosion, dissolution, softening, or melting.

11. The method according to claim 1, further comprising placing the isolation device into a portion of the wellbore, wherein the step of placing is performed prior to the step of degrading at least the portion of the coating via contact with the wellbore fluid.

12. The method according to claim 1, further comprising the step of removing all or a portion of the degraded portion of the isolation device by flowing the degraded portion towards a wellhead.

13. A wellbore isolation device comprising:
a one or more materials that degrade after contact with a fluid, wherein the one or more materials comprises a degradable metal alloy, wherein the one or more materials comprises at least one degradable metal selected from the group consisting of aluminum, magnesium, and any combination thereof; and
a non-metallic coating that covers the one or more materials of the wellbore isolation device, wherein the coating partially or wholly degrades after contact with a wellbore fluid.

14. The device according to claim 13, wherein the one or more materials is the baffle, a core or mandrel, a spacer ring, a slip, a wedge, a retainer ring, an extrusion limiter or backup shoe, a mule shoe, or a sleeve of the bridge plug or frac plug.

15. The device according to claim 13, wherein the coating is made from a film, a plastic, a thermoplastic, a rubber, a glass, an epoxy, or a ceramic.

16. A system for use in a wellbore penetrating a subterranean formation, the system comprising:
a wellbore isolation device located within the wellbore and comprising at least a portion that comprises a one or more materials that degrade after contact with a fluid, wherein the one or more materials comprise a degradable metal alloy, wherein the one or more materials comprises at least one degradable metal selected from the group consisting of aluminum, magnesium, and any combination thereof; and
a non-metallic coating that covers the at least a portion of the wellbore isolation device, wherein the coating partially or wholly degrades after contact with a wellbore fluid.

17. The system according to claim 16, wherein the isolation device is a ball and baffle, a bridge plug, or a frac plug.

18. The system according to claim 17, wherein the at least a portion of the isolation device is the baffle, a core or mandrel, a spacer ring, a slip, a wedge, a retainer ring, an extrusion limiter or backup shoe, a mule shoe, or a sleeve of the bridge plug or frac plug.

19. The system according to claim 16, wherein the coating is made from a film, a plastic, a thermoplastic, a rubber, a glass, an epoxy, or a ceramic.

* * * * *